United States Patent [19]
Jahnke et al.

[11] Patent Number: 5,858,055
[45] Date of Patent: Jan. 12, 1999

[54] WATER-IN-OIL EMULSION FERTILIZER COMPOSITIONS

[75] Inventors: Richard W. Jahnke; John W. Forsberg, both of Mentor; Nils O. Pearson, Lyndhurst, all of Ohio

[73] Assignee: The Lubrizol Corporation, Wickliffe, Ohio

[21] Appl. No.: 946,399

[22] Filed: Oct. 7, 1997

[51] Int. Cl.⁶ .................................................. C05C 11/00
[52] U.S. Cl. ............................. 71/27; 71/64.08; 71/64.11
[58] Field of Search ................................. 71/64.08, 64.11, 71/27

[56] References Cited

U.S. PATENT DOCUMENTS

| T969,003 | 4/1978 | Philips et al. ............................. 71/64 F |
| 4,784,706 | 11/1988 | McKenzie ................................... 149/2 |
| 4,997,642 | 3/1991 | Curtis et al. ............................ 71/64.08 |
| 5,451,243 | 9/1995 | Ahlnäs ................................... 71/64.11 |
| 5,482,529 | 1/1996 | Ahlnäs et al. ......................... 71/64.08 |
| 5,512,079 | 4/1996 | Jahnke et al. ......................... 71/64.08 |
| 5,518,517 | 5/1996 | Jahnke et al. ......................... 71/64.08 |

FOREIGN PATENT DOCUMENTS

| 557568A1 | 9/1993 | United Kingdom . |
| WO93/16968 | 9/1993 | WIPO . |

*Primary Examiner*—Wayne Langel
*Attorney, Agent, or Firm*—Joseph P. Fischer; James L. Cordek

[57] ABSTRACT

A non-explosive water in oil emulsion fertilizer composition is provided which comprises:
  a discontinuous aqueous phase comprising at least one fertilizer component;
  a continuous oil phase;
  an emulsifier comprising the reaction product of at least one hydrocarbyl substituted phenol with at least one amine and at least one aldehyde.

12 Claims, No Drawings

WATER-IN-OIL EMULSION FERTILIZER COMPOSITIONS

TECHNICAL FIELD OF THE INVENTION

This invention relates to water-in-oil emulsions and more particularly to water in-oil emulsion fertilizers containing Mannich emulsifiers and water-soluble fertilizer components in the discontinuous water phase.

BACKGROUND OF THE INVENTION

It is an object of the invention to produce fertilizer compositions which provide controlled release of the fertilizer components. Water-in-oil emulsions for a variety of uses are known. Water-in-oil emulsions have also been used for emulsion explosives.

Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, interalia, in U.S. Pat. Nos. 5,047,17; and 4,828,633. The emulsifier is a salt derived from high molecular weight carboxylic acylating agent coupled to a low molecular weight carboxylic acylating agent. Succinic acids and anhydrides are the preferred acylating agents.

U.S. Pat. No. 4,784,706 discloses emulsion explosive compositions containing a phenolic derivative of polypropene or polybutene as an emulsifier. Among the phenolic emulsifiers disclosed is one formed by reacting a polybutenyl phenol with formaldehyde and a polyamine.

United States defensive publication T969,003 discloses water-in-oil emulsion fertilizers. These materials are prepared by dissolving an invert emulsifier in an oil such as kerosene. The amount of surfactant used can vary over a wide range. Acceptable release rates are obtained when the surfactant makes up between 0.6 and 1% of the fertilizer formulation. A liquid fertilizer (a water solution) is emulsified with the oil to form an invert emulsion containing 80–90% liquid fertilizer, 10–20% oil and 0.6–1% surfactant. Ammonium phosphate, ammonium polyphosphate, ammonium nitrate, potassium chloride, urea solutions and mixtures thereof may be used as liquid fertilizers.

Patent Application W093/16968 discloses a method of transport and storage of fertilizer compositions. The nutrient component of the fertilizer composition is in the form of the discontinuous water phase of a water-in-oil emulsion. The volume-phase ratio of the discontinuous water phase to the total volume is in the range of 0.85–0.95. The nutrient component may include urea, ammonium nitrate or calcium ammonium nitrate. The emulsifier is added to the oil phase prior to stirring together the aqueous phase and the oil phase British Patent Application 0557568A1 discloses fertilizer compositions comprising dispersions or solution of nutrient components and the method for their manufacture. The solution/dispersion constitutes the discontinuous phase of a water-in-oil emulsion having a volume phase ratio of the discontinuous phase to the total volume in the range of 0.80–0.9. The oil or hydrocarbon component of the water-in-oil emulsion comprises mineral vegetable or animal oils, wax or a mixture of these, and the emulsion comprises at least one water-in-oil emulsifier. The oil phase may include an elastomer. The emulsifier disclosed in the examples is Sorbitan Monooleate (Span 80 from ICI).

U.S. Pat. No. 5,518,517 discloses a non-explosive water-in-oil emulsion fertilizer composition comprising: a discontinuous aqueous phase comprising at least one fertilizer component; a continuos oil phase, and an emulsifier comprising the reaction product of at least one hydrocarbyl substituted succinic acylating agent, and at least one co-reactant selected from the group consisting of: primary alkanol amines, secondary alkanol amines, primary amines, secondary amines, tertiary amines, polyamines, alcohols, polyol, and phenols is disclosed. The fertilize compositions provided for delayed release of the fertilizer components.

U.S. Pat. No. 5,512,079 discloses a non-explosive water-in-oil emulsion fertilizer composition comprising:

a discontinuous aqueous phase comprising at least one fertilizer component;

a continuos oil phase, and an emulsifier comprising the reaction product of at least one hydrocarbyl succinic acylating agent succinic acylating agent, delayed release emulsion fertilizer compositions comprising an aqueous phase containing at least one fertilizer component, a continuos oil phase, and an emulsifier comprising the reaction product of a succinic acylating agent, and at least one tertiary alkanol amine.

SUMMARY OF THE INVENTION

A non-explosive water in oil emulsion fertilizer composition is provided which comprises: a discontinuous aqueous phase comprising at least one fertilizer component; a continuous oil phase; and an emulsifier comprising the reaction product of at least one hydrocarbyl substituted phenol reacted with an aldehyde and an amine.

DETAILED DESCRIPTION OF THE INVENTION

The fertilizer compositions of the present invention are designed to provide controlled release of the fertilizer components. By varying the composition of the emulsifier, the rate of release of the fertilizer components from the emulsion to the environment may be varied. The compositions are intended for lawn, garden, and agricultural use.

When ordinary fertilizer components are applied, the nutrients they contain are released very quickly. If they are not absorbed immediately, either by the soil or by the growing plants, they may run off the land into the ground water. This run off is a problem because the plants which were to be fertilized can no longer obtain the components which have run off, and the run off can cause pollution of the ground water. It is desirable to provide fertilizers which release their nutrient components over a period of time, and thereby provide for better utilization of the fertilizer applied, as well as reduced pollution of ground water. Generally speaking, the more oil and emulsifier in a composition, the slower the release observed. However, oil and emulsifiers are not fertilizer components in that they do not provide nutrition to plants. In addition, oil may itself be environmentally undesirable. Accordingly, it is desired to obtain sustained release with as low levels of oil and emulsifier as possible.

Surprisingly, it has been found that the emulsifiers of the present invention provide controlled release of the fertilizer components at low levels of oil and emulsifier. More particularly, it has been found that the emulsifiers of the present invention allow a slow rate of release to be achieved using vegetable oils as the oil phase of the emulsion.

The present invention provides for a composition in which a at least one hydrocarbyl substituted phenol reacted with an aldehyde and an amine to form a product which acts as an emulsifier. These substituted phenolic materials are often referred to as Mannich emulsifiers.

The term "emulsion" as used in this specification and in the appended claims is intended to cover not only water-in-oil emulsions, but also compositions derived from such emulsions wherein at temperatures below that at which the emulsion is formed the discontinuous phase is solid or in the form of droplets of super-cooled liquid. This term also covers compositions derived from or formulated as such water-in-oil emulsions that are in the form of gelatinous or semi-gelatinous compositions.

The term "hydrocarbyl" is used herein to include:

(1) hydrocarbyl groups, that is, aliphatic (e.g., alkyl or alkenyl), alicyclic, cycloalkyl, cycloalkenyl), aromatic, aliphatic- and alicyclic-substituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the, context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which, while having predominantly hydrocarbyl character within the context of this invention, contain other than carbon in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three nonhydrocarbon groups or heteroatoms and preferably no more than one, will be present for each ten carbon atoms in a hydrocarbyl group. Typically, there will be no such groups or heteroatoms in a hydrocarbyl group and it will, therefore, be purely hydrocarbyl. The hydrocarbyl groups are preferably free from acetylenic unsaturation; ethylenic unsaturation, when present will generally be such that there is no more than one ethylenic linkage present for every ten carbon- to-carbon bonds. The hydrocarbyl groups are often completely saturated and therefore contain no ethylenic unsaturation. The term "lower" as used herein in conjunction with terms such as alkyl, alkenyl, alkoxy, and the like, is intended to describe such groups which contain a total of up to 7 carbon atoms.

The Mannich emulsifiers used in the compositions of the present invention are prepared by reacting at least one hydrocarbyl substituted phenol with at least one amine and at least one aldehyde. The individual reactants are described more fully below.

Hydrocarbyl substituted phenol

The hydrocarbyl substituted phenols useful in preparing Mannich emulsifiers may be represented by the formula:

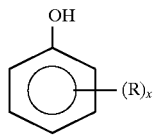

wherein R is a $C_{10}$ to about a $C_{500}$ hydrocarbyl group and x is either 1 or 2.

Preferably, R is an aliphatic or alicyclic hydrocarbyl group with less than about 10% of its carbon-to-carbon bonds being unsaturated. R can be derived from olefins of from 10 to about 30 carbon atoms with alpha-olefins being particularly useful. Examples of such olefins include 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, etc., are particularly useful; these commercial alpha-olefin fractions also usually include minor amounts of alpha-olefins outside the given ranges.

The R group may be a polyolefin. In this case, the R group contains at least 10 carbon atoms, and preferably about 60 carbon atoms to about 180 carbon atoms, and may contain polar substituents, oil-solubilizing pendant groups, and be unsaturated within the general limitations explained hereinabove.

The production of such hydrocarbyl substituted phenols and their derivatives is well known to those of skill in the art and need not be discussed in detail herein. Generally, these processes involve the reaction of an olefin or a chlorinated hydrocarbon with phenol in the presence of an acid catalyst. The reaction is conducted at a moderate temperature within the range of about 30°–60° C. The acid catalyst include materials such as $BF_3$, sulfonic acids, $H_2SO_4$ on a carrier such as clay, and $AlCl_3$ and the like. The reaction may be conducted neat or in the presence of a solvent. The product from this reaction is a hydrocarbyl substituted phenol wherein the substituent is derived from the olefin or chlorinated hydrocarbon.

The ethylenically unsaturated hydrocarbon reactant and the chlorinated hydrocarbon reactant used in the preparation of these hydrocarbyl substituted phenols are preferably substantially saturated, except for the ethylenic unsaturation referenced above, petroleum fractions and substantially saturated olefin polymers and the corresponding chlorinated products. Polymers and chlorinated polymers derived from mono-olefins having from 2 to about 30 carbon atoms are preferred. Especially useful polymers are the polymers of 1-mono-olefins such as ethylene, propene, 1-butene, isobutene, -methyl-1-butene, 3-methyl-1-butene, 1-pentene, 1-hexene, 1-heptene, 1-octene, 1-nonene, -methyl-1-heptene, 3-cyclohexyl-1-butene, and -methyl-propyl-1-hexene. Polymers of medial olefins, olefins in which the olefinic linkage is not at the terminal position, likewise are useful. These are exemplified by butene, 3-pentene, and 4-octene.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

In one embodiment of the invention, the polymers and chlorinated polymers are obtained by the polymerization of a $C_4$ refinery stream having a butene content of about 3% to about 7% by weight and an isobutene content of about 30% to about 60% by weight in the presence of a Lewis acid catalyst such as aluminum chloride or boron trifluoride.

These polyisobutenes preferably contain predominantly (that is, greater than about 80% of the total repeat units) isobutene repeat units of the configuration:

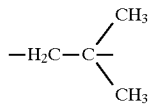

The chlorinated hydrocarbons and ethylenically unsaturated hydrocarbons used in the preparation of the hydrocarbyl substituted phenols preferably have up to about 500 carbon atoms per molecule. The polymeric materials which may be used to prepare the hydrocarbyl substituted phenols may be characterized, as above, by the average number of carbon atoms which they contain. Polymeric materials are not uniform, and contain a variety of molecules of different chain lengths. Such polymers have also been characterized by their Mn (number average molecular weight). The average number of carbons correlates with the Mn of the polymer. For example, if a polymer containing an average of 100 carbon atoms is reacted with phenol, the substituted hydrocarbyl substituted phenols produced has an Mn of approximately 1500. Similarly, for a polymer containing an average of 500 carbon atoms, the substituted hydrocarbyl substituted phenols produced would have an Mn of approximately 7100. Such polymers have also been characterized by their Mw (weight average molecular weight). Because the chain lengths of a polymeric material are not always evenly distributed, the Mw and Mn are not always identical. The polymeric materials useful in preparing the hydrocarbyl substituted hydrocarbyl substituted phenols have Mw/Mn ratios from about 1.5 or about 1.8, or about 2, or to about 2.5, to about 4.5, or to about 3.2.

The polyalkylene may be any of those described above. In one embodiment, the polyalkylene has an Mn from about 400, or about 1300, or about 1500, or to about 1600 to about 5000, or to about 2800, or to about 2400, or to about 2000 and a Mw/Mn of at least 1.5, as described above. The preparation and use of substituted hydrocarbyl substituted phenols wherein the substituent is derived from such polyolefins are described in U.S. Pat. No. 4,234,435, the disclosure of which is hereby incorporated by reference.

In another embodiment, the hydrocarbyl group contains an average from about 8 or about 100, or about 12 up to about 40, or to about 30, or to about 24, or to about 20 carbon atoms. In one embodiment, the hydrocarbyl group contains an average from about 16 to about 18 carbon atoms. In another embodiment, the hydrocarbyl group is tetrapropenyl group. In one embodiment, the hydrocarbyl group is an alkenyl group.

Amines

The amines useful in the preparing the Mannich emulsifiers useful in the present invention include ammonia, monoamines, hydroxyamines, and polyamines. While ammonia and mono-amines may be used to form the emulsifiers used in the present invention, polyamines are preferred.

The monoamines have hydrocarbyl groups each independently containing from 1, or about 2 to about 24 or to about 12, or to about 6 carbon atoms in each hydrocarbyl group. In one embodiment, the hydrocarbyl group is an alkyl group. Examples of monoamines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary amines include dimethylamine, diethylamine, dipropylamine, dibutylamine, dicyclopentylamine, dicyclohexylamine, methylbutylamine, ethylhexylamine, etc.

The polyamines include amines represented by the formula:

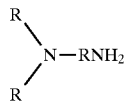

wherein each R is independently a hydrocarbyl group of one to about eight carbon atoms or hydrogen. Where two R groups are present in the same molecule they can be joined by a direct carbon-to-carbon bond or through a heteroatom (e.g., oxygen, nitrogen or sulfur) to form a 5-, 6, 7- or 8-membered ring structure. Examples of such heterocyclic amines include N-(hydroxyl lower alkyl)-morpholines, -thiomorpholines, -piperidines, -oxazolidines, -thiazolidines and the like. The amines useful in forming the emulsifiers of the present invention may be aliphatic, cycloaliphatic, aromatic or heterocyclic, including aliphatic-substituted aromatic, aliphatic substituted cycloaliphatic, aliphatic substituted heterocyclic, cycloaliphatic substituted aliphatic, cycloaliphatic substituted aromatic, cycloaliphatic substituted heterocyclic, aromatic substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines, provided that there is within the structure at least one primary or secondary amino group. These amines may be saturated or unsaturated. If unsaturated, the amine is preferably free from acetylenic unsaturation. These amines may also contain non-hydrocarbon substituents or groups as long as these groups do not significantly interfere with the reaction of such amines with the phenolic and aldehyde reactants. Such non-hydrocarbon substituents or groups include lower alkoxy, lower alkyl, mercapto, nitro, and interrupting groups such as —O— and —S— (e.g., as in such groups as

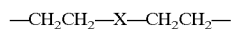

where X is —O— or —S—). Typically, however, each R is a lower alkyl group of up to seven carbon atoms. Polyamines may be used to form the Mannich emulsifiers provided that the amine contains at least one primary or secondary nitrogen.

The polyamines include aliphatic, cycloaliphatic and aromatic polyamines analogous to the aliphatic, cycloaliphatic and aromatic monoamines described below except for the presence within their structure of at least one additional >NH or —NH group.

Hydrazine and substituted-hydrazines can also be used. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, phenylhydrazine, and the like.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene.

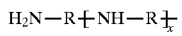

group per nine amino units present on the main chain; for example, 1–4 of such branched chains per nine units on the main chain, but preferably one side chain unit per nine main chain units. Thus, these polyamines contain at least three primary amino groups and at least one tertiary amino group. These amines may be expressed by the formula:

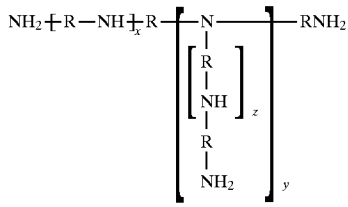

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to 1. The x and y units may be sequential, alternative, orderly or randomly distributed. A useful class of such polyamines includes those of the formula:

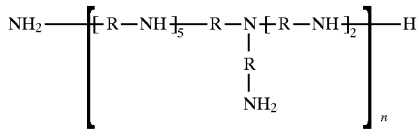

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

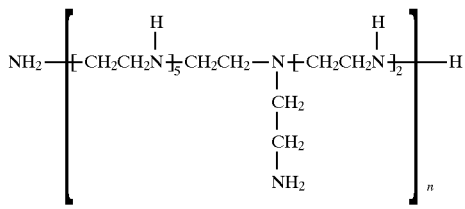

wherein n is an integer in the range of 1 to about 3. The groups within the brackets may be joined in a head-to-head or a head-to-tail fashion. U.S. Pat. No. 3,200,106 and are incorporated herein by reference for their disclosures relative to said polyamines.

Suitable polyamines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

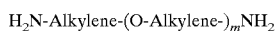

wherein m has a value of from about 3 to about 70, preferably from about to about 10 to about 35, and by the formula

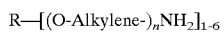

wherein n is a number in the range of from 1 to about 70. R is a saturated hydrocarbyl group of up to about 10 carbon atoms with multiple sites of attachment. If there is more than one [—(O-Alkylene-)$_n$NH$_2$] group attached to R, then the sum of all of the n's is from about 3 to about 70 and generally from about 6 to about 35. The alkylene groups may be straight or branched chains and contain from 1 to about 7 carbon atoms, and usually from 1 to about 4 carbon atoms. The various alkylene groups present within the above formulae may be the same or different. More specific examples of these polyamines include:

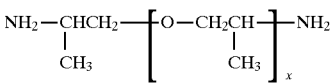

wherein x has a value of from about 3 to about 70, preferably from about to 3; and

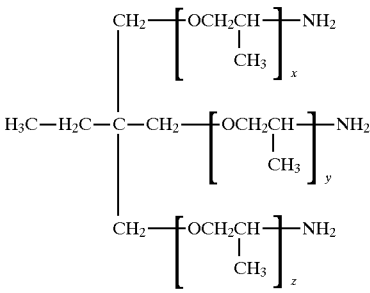

wherein x+y+z have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene-, polyamines are commercially available from the Huntsman Chemical Company, Inc. under the trade name "Jeffamine". U.S. Pat. Nos. 3,804,763 and 3,948,800 are incorporated herein by reference for their disclosure of such polyoxyalkylene polyamines.

Useful polyamines are the alkylene polyamines, including the polyalkylene polyamines, as described in more detail hereafter. The alkylene polyamines include those conforming to the formula:

wherein n is from 1 to about 10, preferably from 1 to about 7; each R and R' is independently a hydrogen atom, a hydrocarbyl group or a hydroxy-substituted hydrocarbyl group having up to about 700 carbon atoms, preferably up to about 100 carbon atoms, more preferably up to about 50 carbon atoms, more preferably up to about 30 carbon atoms, with the proviso that at least one of R and at least one of R' are hydrogen; and the "Alkylene" group has from about 1 to about 18 carbon atoms, preferably from 1 to about 4 carbon atoms, with the preferred Alkylene being ethylene or propylene. Useful alkylene polyamines are those wherein each R and each R' is hydrogen with the ethylene polyamines, and mixtures of ethylene polyamines being particularly preferred. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, diethylene triamine, triethylene tetramine, tetraethylene pentamine, pentaethylene hexamine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(-aminoethyl) piperazine, 1,4-bis(-aminoethyl)piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines, Aliphatic" in The Encyclopedia of Chemical Technology, Third Edition, Kirk-Othmer, Volume 7, pp. 80–60, a Wiley-Interscience Publication, John Wiley and Sons, 1979, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the-somewhat complex mixtures of alkylene polyamines, including cyclic condensation products such as piperazines.

Alkoxylated alkylene polyamines (e.g., N,N-1 (diethanol) -ethylene diamine) can be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Hydroxyamines

The hydroxyamines may be primary, or secondary. The terms "hydroxyamine", "alkanolamine" and "aminoalcohol" describe the same class of compounds and, therefore, may be used interchangeably. The hydroxyamines may be primary or secondary alkanol amines or mixtures thereof. Such amines may be represented, respectively, by the formulae:

$H_2N-R'-OH$ and

-continued

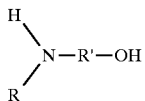

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' maybe an acyclic, alicyclic or aromatic group. Typically, R' is an acyclic straight or branched alkylene group such as an ethylene, 1,-propylene, 1,-butylene, 1,-octadecylene, etc. group.

Examples of useful N-(hydroxyl-substituted hydrocarbyl) amines include ethanolamine di-ethanol amine, ethylethanol amine, di-(3-hydroxylpropyl)amine, N-(3-hydroxylbutyl) amine, N-(4-hydroxylbutyl)amine, N,N-di-(-hydroxylpropyl)amine, N-(2-hydroxyl ethyl)cyclohexyl amine, N-3-hydroxyl cyclopentyl amine, N-(hydroxyl ethyl) piperazine, and the like.

Further hydroxyamines are the hydroxy-substituted primary amines described in U.S. Pat. No. 3,76,743 by the general formula $R_a-NH_2$ wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a-NH_2$ wherein $R_a$ is a mono- or polyhydroxy-substituted alkyl group. Specific examples of the hydroxy-substituted primary amines include 2-amino-1-butanol, 2-amino-2-methyl-1-propanol, 2-amino-1-propanol,3-amino-1-propanol, 2-amino-methyl-1,3-propanediol, 2-amino-2-ethyl-1,3-propanediol, N-(beta-hydroxypropyl)-N'-(beta-aminoethyl)-piperazine, tris-(hydroxymethyl)amino methane (also known as trismethylolamino methane), 2-amino-1-butanol, ethanolamine, beta-(beta-hydroxyethoxy)-ethyl amine, 5-amino-1-pentanol, N-(beta-hydroxyethyl)1,3-diamino propane, 1,3-diamino-hydroxypropane, N-(beta-hydroxy ethoxyethyl)ethylenediamine, and the like. U.S. Pat. No. 3,576,743 is incorporated herein by reference for it disclosure of hydroxyamines.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-2(-hydroxyethyl)ethylene diamine, N,N-bis(2-hydroxyethyl)ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of he above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The hydroxyamines may also be ether N-(hydroxy-substituted hydrocarbyl)amines. These are hydroxyl-substituted poly(hydrocarbyloxy) analogs of the above-described hydroxy amines (these analogs also include hydroxyl-substituted oxyalkylene, analogs). Such N-(hydroxyl-substituted hydrocarbyl)amines maybe conveniently prepared by reaction of epoxides with afore-described amines and maybe represented by the formulae:

wherein x is a number of about 2 to about 15, each R is independently a hydrocarbyl group of one to about eight carbon atoms or hydroxyl-substituted hydrocarbyl group of two to about eight carbon atoms and R' is a divalent hydrocarbyl group of about 2 to about 18 carbon atoms.

Polyamine analogs of these hydroxy amines, particularly alkoxylated alkylene polyamines (e.g., N,N-(diethanol)-ethylene diamine) may also be used. Such polyamines maybe made by reacting alkylene amines (e.g., ethylenediamine) with one or more alkylene oxides (e.g., ethylene oxide, octadecene oxide) of 2 to about 20 carbons. Similar alkylene oxide-alkanol amine reaction products may also be used such as the products made by reacting the afore-described primary or secondary alkanol amines with ethylene, propylene or higher epoxides in a 1:1 or 1:molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl)ethylene diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Aldehyde

The aldehydes used in preparing Mannich emulsifiers may be C-1 to about C-12 aldehydes. Aromatic aldehydes may used. Typical aldehydes include formaldehyde, acetaldehyde, proprionaldehyde, butyraldehyde, valeraldehyde, isovaleraldehyde, hexanal, 2-methylvaleraldehyde, heptaldehyde, 2,3-dimethylvaleraldehyde, octanal, nonyl aldehyde, decyl aldehyde, undecylic aldehyde, dodecyl aldehyde, benzaldehyde, o-anisaldehyde, m-anisaldehyde, p-anisaldehyde, o-tolualdehyde, m-tolualdehyde, p-tolualdehyde, 1-naphthaldehyde, 2-naphthaldehyde, 2-methoxy-1-naphthaldehyde, and 4-methoxy-1-naphthaldehyde. The preferred aldehydes are C-1 to C4 aldehydes, that is, formaldehyde, acetaldehyde, proprionaldehyde, and butyraldehyde. The most preferred aldehyde is formaldehyde which may be used in the form of a water solution, as pure formaldehyde gas, or most conveniently, in the form of polymers such as paraformaldehyde.

Formation of the Emulsifier Compositions

The ratio of reactants utilized in the preparation of the inventive emulsifier compositions may be varied over a wide range. Generally, each equivalent of the hydrocarbyl substituted phenol is reacted with about 0.5 to about 2 equivalents of the aldehyde, and about 0.5 to about 2 equivalents of amine. A phenol is considered to be a monoequivalent species. An amine has an equivalence based upon the number of primary and secondary amine groups within the molecule. An aldehyde has an equivalence based upon the number of aldehyde groups in the molecule. However, mono aldehydes are the most commonly used species and the aldehyde is most often a mono equivalent species. If a volatile amine, such as ammonia, methyl amine, dimethyl amine, ethylamine, or the like is used as the amine, a large excess of the amine, such as 5 moles of amine per mole of phenol, may be used since the amine can easily be stripped from the product when the reaction is complete. For reactions which involve the amine, an equivalent weight of an amine is the molecular weight of the amine divided by the total number of primary and secondary nitrogens present in the molecule.

The condensation of phenols, amines, and aldehydes to form Mannich derivatives is well known to those skilled in the art. The reaction between the hydrocarbyl substituted phenol, the aldehyde and the amine may be conducted with or without a diluent or solvent. The reactants are mixed, and generally heated to a temperature of between about 110° and 185° C. The water formed during the condensation reaction is driven off, and the desired product is isolated. If polyamines are chosen as the reactant, condensation at several sites may occur and larger molecules may be built up. The reaction may be run with acidic or basic catalysts. Acid catalysts include mineral acids and acidic ion exchange resins. Basic catalysts include materials more basic than the amine reactants such alkali metal carbonates and hydroxides. The reaction is well known, and those skilled in the art will have little difficulty in finding conditions which are appropriate for their particular phenol, amine, and aldehyde. The Mannich reaction may be illustrated by the following equation:

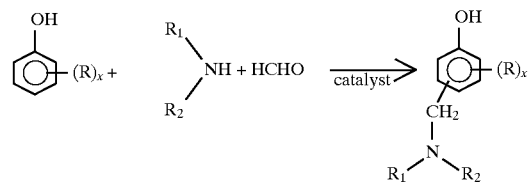

The following examples illustrate the preparation of the compositions of this invention. Unless otherwise indicated, in the following examples and elsewhere in the specification and claims, all parts and percentages are by weight, and all temperatures are in degrees centigrade.

EXAMPLE A

A C-16 hydrocarbyl substituted phenol (710 g. 2.23 equivalents) was mixed with paraformaldehyde (74 g. 2.23 equivalents) and gaseous ammonia (170 g. Of NH$_3$ 10 equivalents). The mixture was stirred at 60°–65° C. for hours. Nitrogen was blown over the reaction mixture at 65° C. for 1.5 hrs. The reaction mixture was stripped at 130° C. and 5.5 mm of mercury pressure for 3 hours. The resulting reaction mixture was filtered to yield the desired Mannich emulsifier.

EXAMPLE B

A hydrocarbyl substituted phenol (500 g. 0.40 equivalents) was mixed with a mixed hydrocarbon solvent with a boiling range of 182° to 199° C. and heated to 70° C. Aminoethylethanolamine (41.6 grams 0.40 equivalents) was added over 10 minutes and the mixture was heated to 110° C. Paraformaldehyde (74 g. 2.23 equivalents) was added in aliquots over a period of 1 hour. The mixture was heated to 120° C. for 2 hours, and then heated to 150° C. for 3 hours. Water and distillable organic materials were collected. The resulting reaction mixture was filtered to yield the desired Mannich emulsifier.

EXAMPLE C

A polypropylene substituted phenol (150 g. 3.49 equivalents) was mixed with ethanolamine (6.4 grams 1.74 equivalents), paraformaldehyde (11. g. 3.49 equivalents), Amberlyst 1 catalyst, and toluene (70 ml.). The mixture was heated under nitrogen to reflux (maximum temperature 130° C.) until 71 ml of water were collected in a Dean Stark trap. The mixture was stripped under vacuum at 20 mm. pressure and 140° C. for hours. The mixture was filtered at 135°–140° C. to yield a Mannich base emulsifier in which two phenolic groups were attached to the each nitrogen.

EXAMPLE D

A polypropylene substituted phenol (494 g. 1.15 equivalents) was mixed with 2-amino pyridine (54 grams 0.57 equivalents), paraformaldehyde (38 g. 1.15 equivalents), and toluene (300 ml.). The mixture was heated under nitrogen at reflux (130° C.) for 7 hours. 24 ml of water were collected in a Dean Stark trap. The mixture was stripped under vacuum at 15 mm. pressure 125° C. and filtered at 125° C. to yield a Mannich base emulsifier.

EXAMPLE E

A polypropylene substituted phenol (860 g. 2.0 equivalents) was mixed with diethanolamine (210 grams 2.0 equivalents), paraformaldehyde (66 g. 2.0 equivalents), and toluene (300 ml.). The mixture was heated under nitrogen at reflux (130° C.) for 8 hours. 42 ml of water were collected in a Dean Stark trap. The mixture was stripped under vacuum at 135° C. and filtered at 135° C. to yield a Mannich base emulsifier.

EXAMPLE F

A polypropylene substituted phenol (475 g. 1.8 equivalents) was mixed with diethylamine (183 ml 1.786 equivalents), paraformaldehyde (59 g. 1.8 equivalents), and toluene (400 ml.). The mixture was heated under nitrogen at reflux for 8 hours. 34 ml of water were collected in a Dean Stark trap. The mixture was stripped under vacuum at 135° C. and filtered at 135° C. to yield a Mannich base emulsifier.

EXAMPLE G

A polypropylene substituted phenol (860 g. 2.0 equivalents) was mixed with diethanolamine (210 grams 2.0 equivalents), paraformaldehyde (66 g. 2.0 equivalents), and toluene (300 ml.). The mixture was heated under nitrogen at reflux (130° C.) for 8 hours. 42 ml of water were collected in a Dean Stark trap. The mixture was stripped under vacuum at 135° C. and filtered at 135 ° C. to yield a Mannich base emulsifier.

EXAMPLE H

A $C_{18-24}$ hydrocarbyl substituted phenol (400 g. 0.94 equivalents) was mixed with 3-amino-1H-1,2,4-triazole (100 grams 1.19 equivalents), paraformaldehyde (36 g. 1.10 equivalents), a 50% caustic soda solution (3 grams) as a catalyst, and toluene (200 ml.). The mixture was heated under nitrogen at 90°–100° C. for 2 hours. 23 grams of water were collected in a Dean Stark trap. The mixture was filtered at 130°–140° C. to yield a Mannich base emulsifier.

Fertilizer Compositions

The fertilizer compositions of this invention are water-in-oil emulsions using the phenolic derivatives described above as emulsifiers. The inventive fertilizer compositions comprise a discontinuous aqueous fertilizer phase comprising at least one water soluble fertilizer component, a continuous organic phase comprising at least one oil, and an emulsifying amount of at least one of the compositions of the invention. The fertilizer compositions of the present invention share some characteristics with explosive emulsions. For example, both are water-in-oil emulsions, and both may include ammonium nitrate as a component. However, the fertilizer emulsions are different from the explosive emulsions in that the ability to detonate is a necessary feature of the emulsion explosives and is an undesirable characteristic of an emulsion fertilizer. There are several methods which may be used to assure that emulsion fertilizer is non-explosive. It is important to avoid materials which may act as sensitizers in emulsion explosives. These explosive sensitizers include glass or resin microspheres or other gas containing particles, self explosive materials such as TNT, DNT, RDX and the like and various organic nitrates. Emulsion explosives may contain particulate oxygen supplying salts such as potassium perchlorate. Extra quantities of oxygen supply salts are to be avoided in fertilizer compositions. Ammonium nitrate is commonly used in emulsion explosives. It also a valuable fertilizer ingredient. Urea may be used to replace some of the ammonium nitrate. Such replacement result in an emulsion which is less explosive. The inclusion of other fertilizer components which are not oxidizing salts, such as phosphates tend to make the emulsions less explosive. By use of one or more of the methods discussed above, the fertilizer compositions of the present invention may be rendered non-explosive.

The water soluble fertilizer components include the major fertilizer components which supply nitrogen, potassium and phosphorous. Optionally, various components to supply specialized nutrients may be included. Thus, if a particular soil is deficient in a trace element a water soluble form of this element could be included in the discontinuous phase. Examples of such trace elements include boron, iron, manganese, sulfur, zinc, copper and molybdenum. These materials may be used in the form of their salts, or in other suitable form. If the salts are soluble, they may be incorporated in the aqueous phase, and if insoluble, they may be suspended in the emulsion. Among the major components, nitrogen may be supplied by organic material such as urea, guanidine, and their salts, as well as by inorganic materials such o as ammonium nitrate, alkali metal nitrates, and alkaline earth nitrates. Potassium may be supplied by potassium salts such as carbonate, chloride, nitrate, phosphates, pyrophosphate, and sulfate. Phosphorous may be supplied by alkali and alkaline earth metal phosphate salts. The continuous organic phase, that is oil phase, that is useful in the fertilizer emulsions of the invention can include oils from a variety of sources, including natural and synthetic oils and mixtures thereof. Hydrocarbon oils, for example, paraffinic, olefinic, naphthenic, aromatic, saturated or unsaturated hydrocarbons, may be used. In general, the oil is water-immiscible, emulsifiable and is either liquid at about 20 C. or becomes a liquid at a temperature of up to about 95° C., and preferably up to about 60 C.

The biodegradability of the oil phase is important in fertilizer compositions. Thus the more biodegradable mineral oils are favored over the heavier less biodegradable oils. Vegetable oils are favored because of their biodegradability and because of their ready availability. Usable vegetable oils include babbasu, palm, castor, olive, peanut, rapeseed, corn, sesame, coconut, cottonseed, soybean, linseed, sunflower, and safflower. While in general it has been found that vegetable oils in general form emulsions which release the fertilizer components more quickly than emulsions prepared from mineral oils, Mannich emulsifiers provide result with vegetable oil that are as good or better than those produced using mineral oil. Accordingly, Mannich emulsifiers are particularly desirable for use with vegetable oils.

Natural oils include animal oils and vegetable oils (e.g., castor oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils such as polymerized and interpolymerized olefins (e.g., polybutylenes, polypropylenes, propyleneisobutylene copolymers, etc.); alkyl benzenes (e.g., dodecylbenzenes, tetradecylbenzenes, dinonylbenzenes, di-(-ethylhexyl) enzenes, etc.); polyphenyls, biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di-(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like.

Esters useful as synthetic oils also include those made by reacting $C_5$ to $C_{24}$ monocarboxylic acids mono alcohols or polyols. The mono alcohols include $C_1$ to $C_{18}$ aliphatic alcohols. Polyols such as neopentyl glycol, trimethylol propane, pentaerythritol, dipentaerythritol, tripentaerythritol, and polyol ethers.

Unrefined, refined and rerefined oils (and mixtures of each with each other) of the type disclosed hereinabove can be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA; and a mineral oil available from Pennzoil under the trade designation N-70-HT.

The continuous organic phase is preferably present at a level of at least about 2% by weight, more preferably in the range of from about 2% to about 10% by weight, more preferably in the range of from about 3.5% to about 8% by weight based on the total weight of fertilizer emulsion. The discontinuous fertilizer phase is preferably present at a level of at least about 90% by weight, more preferably at a level in the range of from about 90% to about 98% by weight, more preferably from about 92% to about 96.5% by weight based on the total weight of said fertilizer emulsion.

The emulsifier compositions of the invention are preferably present at a level in the range of from about 4% to about 40% by weight, more preferably from about 12% to about 20% by weight based on the total weight of the organic phase. The fertilizer component or components are preferably present at a level in the range of from about 70% to about 95% by weight, more preferably from about 85% to about 92% by weight, more preferably from about 87% to about 90% by weight based on the total weight of the aqueous phase. The water is preferably resent at a level in the range of about 5% to about 30% by weight, more preferably about 8% to about 15% by weight, more preferably about 10% to about 13% by weight based on the weight of the aqueous phase.

The fertilizer emulsions may be prepared by dissolving the emulsifier in the oil phase, and adding the aqueous phase with stirring. The aqueous phase is prepared by dissolving the fertilizer components in water. Only moderate shear mixing is required. Both stirred and static mixers are useable in preparing the emulsions. The fertilizer compositions may include solid fertilizer components suspended in the emulsion. The suspended components may include any of the water soluble fertilizer components noted above. Since these components are suspended in the emulsion, but are not protected by the continuous oil phase, they will be released rather quickly. By this means, a fertilizer may be prepared which provides for early release of some components, and delayed release of the rest. For example, a fertilizer could be prepared which releases some nitrogen early and delays the rest. Such a fertilizer could provide a fertilizer dosage in one application which would require two applications of conventional fertilizer. In addition, soil conditioning components, which are insoluble in water could be suspended in the fertilizer emulsion. For example powdered limestone or sulfur could be suspended in the fertilizer emulsion. The limestone and sulfur would serve to shift the pH balance of the soil.

FERTILIZER EXAMPLES

Several fertilizer compositions were prepared by dissolving the emulsifier in the oil phase. The emulsifier made up 20% of the oil phase. Emulsifier compositions containing neutral oil were incorporated in such a manner that the actual emulsifier level was 20% of the oil phase. Any neutral oil contained in the emulsifier composition was considered to be part of the oil phase, and replaced added oil. The oil and the emulsifier were blended at approximately 90° C. The aqueous phase was prepared by heating 150 g. of water, 400 g. ammonium nitrate, and 400 g. of urea to 82°–85° C. A 50 gram sample of the oil phase at a temperature of 90° C. was placed in a 1.5 quart plastic container. The hot aqueous phase was added, with stirring, at a temperature of 82°–85° C., to the oil phase. The addition was conducted slowly so that the aqueous phase added was assimilated before further aqueous phase was added. Addition required three to seven minutes. During the addition, the mixture was stirred using a Mixmaster® mixer. During the addition, the mixer was run at 50 volts. After addition was complete, the emulsification process was completed by stirring for two minutes using the Mixmaster® mixer at 120 volts.

The release characteristics of the fertilizer samples prepared above were tested. There is no generally accepted method for testing the release characteristics of emulsion fertilizers. However, the method of measuring the release characteristics of a delayed release fertilizer described in U.S. Pat. Nos. 5,512,079 and 5,518,517 was used to measure the rate of release of fertilizer components was used. According to this method, the emulsion is prepared and a 1.7 gram sample is taken and placed, as one lump, in a stoppered 250 ml. Erlenmeyer flask. 100 milliliters of water are added to the flask and the mixture is maintained at 30° C. The flask is shaken—on a Lab-Line® Orbit Environ orbital shaker at 200 RPM. Samples of the aqueous phase are withdrawn on a regular basis and analyzed by conductivity for the fertilizer component contained in the emulsion. After analysis, the aqueous sample is returned to the flask and shaking continued. A graph of the amount of the fertilizer component released versus time is prepared. The time when 10%, 20% etc. of the fertilizer component is released is estimated from the graph.

Example A-1

HITEC 4941, a commercially available Mannich emulsifier formed from a hydrocabyl phenol. A low molecular weight aldehyde and a polyamine was formed into a fertilizer emulsion using the procedure noted above. The oil was Kaydol® refined white mineral oil.

Example B-1

The rate of release of the fertilizer components from the emulsion of example A-1 was tested according to the procedure noted above.

RELEASE RATE
KAYDOL & HITEC 4941 EMULSIFIER

| % RELEASED | DAYS OF EXPOSURE |
|---|---|
| 10 | 2 |
| 20 | 2 |
| 30 | 3 |
| 40 | 4 |
| 50 | 5 |
| 60 | 6 |
| 70 | 6 |
| 80 | 7 |
| 90 | 7 |
| 100 | 14 |

Example A-2

HITEC 4941, a commercially available emulsifier was formed into a fertilizer emulsion using the procedure noted above. The oil was a high oleic acid content sunflower oil, Trisun® 80.

Example B-2

The rate of release of the fertilizer components from the emulsion of example A-2 was tested according to the procedure noted above.

RELEASE RATE
SUNFLOWER OIL & HITEC 4941 EMULSIFIER

| % RELEASED | DAYS OF EXPOSURE |
|---|---|
| 10 | 3 |
| 20 | 6 |
| 30 | 7 |
| 40 | 8 |
| 50 | 10 |
| 60 | 12 |
| 70 | 13 |
| 80 | 16 |
| 90 | 18 |
| 100 | 25 |

Example A-3

HITEC 4956, a commercially available Mannich emulsifier formed from a hydrocarbyl phenol. A low molecular weight aldehyde and a polyamine was formed into a fertilizer emulsion using the procedure noted above. The oil was Kaydol® refined white mineral oil.

Example B-3

The rate of release of the fertilizer components from the emulsion of example A-3 was tested according to the procedure noted above.

RELEASE RATE
KAYDOL & HITEC 4956 EMULSIFIER

| % RELEASED | DAYS OF EXPOSURE |
|---|---|
| 10 | 7 |
| 20 | 8 |
| 30 | 10 |
| 40 | 11 |
| 50 | 13 |
| 60 | 14 |
| 70 | 16 |
| 80 | 18 |
| 90 | 20 |
| 100 | 23 |

Example A-4

HITEC 4956, a commercially available emulsifier was formed o into a fertilizer emulsion using the procedure noted above. The oil was a high oleic acid content sunflower oil, Trisun® 80.

Example B-4

The rate of release of the fertilizer components from the emulsion of example A-4 was tested according to the procedure noted above.

RELEASE RATE
SUNFLOWER OIL & HITEC 4956 EMULSIFIER

| % RELEASED | DAYS OF EXPOSURE |
| --- | --- |
| 10 | 5 |
| 20 | 6 |
| 30 | 8 |
| 40 | 10 |
| 50 | 12 |
| 60 | 14 |
| 70 | 16 |
| 80 | 19 |
| 90 | 21 |
| 100 | 25 |

COMPARATIVE EXAMPLES

The following comparative examples illustrate the performance of the prior art emulsifiers used in emulsion fertilizer compositions.

Comparative Examples 1

A fertilizer emulsion composition was prepared using KAYDOL oil and a sorbitan mono-oleate emulsifier using the procedure noted above. The rate of release of the fertilizer components was tested according to the procedure noted above.

RELEASE RATE-EXAMPLE C-1

| % RELEASED | DAYS OF EXPOSURE |
| --- | --- |
| 20 | 0.5 |
| 50 | 1 |
| 90 | 2 |
| 100 | 3 |

Comparative Example 2

A fertilize emulsion composition was prepared using KAYDOL oil and WITCAMIDE-511, a dimeric condensation product of oleic acid and ethanolamine, as an emulsifier using the procedure noted above. The rate of release of the fertilizer components was tested according to the procedure noted above.

RELEASE RATE-EXAMPLE C-2

| % RELEASED | DAYS OF EXPOSURE |
| --- | --- |
| 20 | 0.6 |
| 40 | 1 |
| 60 | 2 |
| 80 | 2.5 |
| 100 | 4 |

Comparative Example 3

A fertilize emulsion composition was prepared using KAYDOL oil and WITCONOL-14, a dimeric condensation product of oleic acid and glycerol, as an emulsifier using the procedure noted above. The rate of release of the fertilizer components was tested according to the procedure noted above.

RELEASE RATE-EXAMPLE C-3

| % RELEASED | DAYS OF EXPOSURE |
| --- | --- |
| 20 | 1 |
| 40 | 2 |
| 60 | 3 |
| 70 | — |
| 80 | 4 |
| 90 | — |
| 100 | 5 |

Comparative Example 4

An attempt was made to prepare a fertilizer emulsion composition was using sunflower oil and a sorbitan mono-oleate emulsifier using the procedure noted above. An emulsion did not form.

Comparative Example 5

An attempt was made to prepare a fertilize emulsion composition using sunflower oil and WITCAMIDE-511, a dimeric condensation product of oleic acid and ethanolamine, as an emulsifier using the procedure noted above. An emulsion did not form.

Comparative Example 6

A fertilize emulsion composition was prepared using sunflower oil and WITCONOL-14, a dimeric condensation product of oleic acid and glycerol, as an emulsifier using the procedure noted above. An emulsion did not form.

We claim:

1. A non-explosive water in oil emulsion fertilizer composition comprising:

a discontinuous aqueous phase comprising at least one fertilizer component;

a continuous oil phase;

an emulsifier comprising the reaction product of at least one hydrocarbyl substituted phenol with at least one amine and at least one aldehyde.

2. A fertilizer emulsion according to claim 1 wherein the hydrocarbyl substituted phenol is represented by the formula:

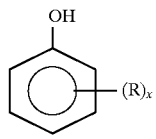

wherein R is derived from a $C_2$ to $C_{30}$ olefin.

3. A fertilizer emulsion according to claim 1 wherein the hydrocarbyl substituted phenol is represented by the formula:

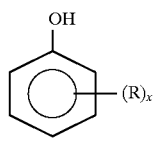

wherein R is derived from a polymerized olefin; said polymerized olefin containing between 10 and 500 carbon atoms.

4. A fertilizer emulsion according to claim 3 wherein R is derived from a polyisobutylene having a number average molecular weight (Mn) of 400 to 4000.

5. A fertilizer emulsion according to claim 3 wherein R is derived from a polyisobutylene having a number average molecular weight (Mn) of 400 to 4000 and the amine is a primary amine.

6. A fertilizer emulsion according to claim 3 wherein R is derived from a polyisobutylene having a number average molecular weight (Mn) of 400 to 4000 and the amine is a secondary amine.

7. A fertilizer emulsion according to claim 1 wherein the amine is represented by the formula:

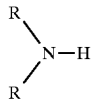

wherein each R is independently a hydrocarbyl group of 1 to 8 carbon atoms or hydrogen.

8. A fertilizer emulsion according to claim 1 wherein the amine is a primary alkanol amine.

9. A fertilizer emulsion according to claim 1 wherein the amine is a secondary alkanol amine.

10. A fertilizer emulsion according to claim 1 wherein the aldehyde is selected from the group consisting of: aldehydes containing 1 to 4 carbon atoms.

11. A fertilizer emulsion according to claim 1 wherein the aldehyde is formaldehyde.

12. A method of fertilizing plants comprising applying a fertilizer emulsion according to claim 1 to the soil in which the plants are planted.

* * * * *